No. 879,394.

PATENTED FEB. 18, 1908.

L. R. LEWIS.

MUSIC CHART OR TABLE.

APPLICATION FILED SEPT. 19, 1904.

*Fig. 1.*

*Fig. 2.*

Witnesses:

Inventor:
Leo R. Lewis,
by Roberts & Mitchell,
Attorneys.

UNITED STATES PATENT OFFICE.

LEO RICH LEWIS, OF SOMERVILLE, MASSACHUSETTS.

MUSIC CHART OR TABLE.

No. 879,394.  Specification of Letters Patent.  Patented Feb. 18, 1908.

Application filed September 19, 1904. Serial No. 224,965.

*To all whom it may concern:*

Be it known that I, LEO RICH LEWIS, a citizen of the United States, and resident of Somerville, in the county of Middlesex and State of Massachusetts, have invented new and useful Improvements in Music Charts or Tables, of which the following is a specification.

This invention relates to music charts or tables adapted for use in the study of music.

It consists in the orderly and tabular arrangement of characters bearing such relation to each other as to give to the user visual information for the purpose of study, practice or reference, of sundry matters essential to the professional education of the musician. Its primary object is to give such visual information of the intervals or tone-relationships between any pair of scale-units, whether said units be expressed in terms of scale-degrees, notes, syllables or other descriptive terms.

Other features of the invention will presently be pointed out in the course of the description and will be readily understood by reference to the accompanying drawings. They will also be pointed out in the claims.

Figure 1 of the drawings illustrates the preferred form of chart or table embodying this invention, a part of said chart being broken away. Fig. 2 of the drawings illustrates an alternative form of chart illustrating my invention, part of said chart being broken away.

The music of cultured nations is based upon a scale of seven different tones arranged in certain relationships to one another. With these seven different tones another tone is generally associated in the mind, forming a scale of eight tones, commonly designated as an octave, which has come to be regarded as the basis of all melody. The eighth tone both completes the series or scale and serves as the starting point of another similar series or scale. It therefore is designated by the same term as the first tone in the various sets of names which are applied to the scale units. This series of tones is known as the diatonic scale. With these eight tones are associated five other tones, commonly called chromatic tones, which find their places between certain of the tones of the diatonic scale. They differ from the diatonic tones in that their respective representations in notes are not always the same. These tones are regarded as derivatives of neighboring tones of the diatonic scale and are notated in a manner to show their derivation. Hence, a chromatic tone may be represented as elevated from the tone below or as depressed from the tone above; that is, as a sharped tone or as a flatted tone. The choice between these representations depends upon well established customs of musical discourse, or upon the tone's function in the harmony which underlies the tone structure or fabric. The scale-units of the full scale including the chromatic tones may be represented by numerals or by letters, or by other established or arbitrary signs.

The numerals commonly used are as follows: 1, sharp-1, flat-2; 2, sharp-2, flat-3; 3; 4, sharp-4, flat-5 (rare or erroneous); 5, sharp-5, flat-6; 6, sharp-6, flat-7; 7; 8 = 1. These numerals name the scale-degrees.

The tones employed in musical discourse are named by letters A B C D E F G, with the word sharp or flat annexed if needed. These letters are called pitch-names and are always applied to the same tones no matter what their scale-relationship. The scale-degrees on the other hand are not always applied to the same tones, but are applied consecutively to the notes of the several scales, both major and minor, beginning at the key-note of the particular scale in question.

The complete gamut employed by voices or instruments is formed by adding, above and below the original tone-series, other tone-series whose tones are identical in internal relationships. The uppermost or lowermost note is always made the starting point of the new series. Thus all relationships existing within a series, or between the notes of a series and those of a neighboring series, will be duplicated up and down the gamut as many times as there are series in the gamut. Therefore any statement or tabulation of data concerning a section of the gamut an octave or more in extent will apply to any symmetrical section above or below.

As a result of equalizing the intervals between each pair of contiguous tones of the complete scale,—dividing the octave into twelve equal parts and forming what is known as the tempered scale,—it is possible to make any tone the starting point of a diatonic scale, preserving the tone relationships by proper selection from the equalized gamut. The number of keys is therefore a full twelve in number both in major and in minor. Indeed, one of the keys (that beginning on F-sharp or G-flat) has two representations, making the total number, in practice, thirteen. From this fact alone it may be inferred that the details of notation are rather complex, and that the student must prepare himself to recognize various representations of the same thing when dealing with musical materials.

One of the objects of this invention is to develop familiarity with all the details of notation in so far as it gives representation of pitch.

Referring to the left hand section of the table in Fig. 1 the notation will be found of all the degrees of all scales major or minor. The keys are named in the margins at the top and bottom of each column of characters representing the scales, the major keys being in horizontal alinement with *M*, the minor keys being in horizontal alinement with *m*. The pitch-names of the notes of the several keys are designated by the characters arranged in vertical columns or rows in vertical alinement with said key-note characters. All the characters in the several rows which have the same scale-degree, each in its proper key, are in transverse or horizontal alinement. The scale-degrees are indicated in margins at the left and right of said notes or pitch characters, the major degrees being arranged in alinement with said *M* and the minor degrees in alinement with said *m*. The abbreviations and characters used in this section of the chart will be obvious: the marginal capital letters at the top and bottom of this section of the chart—A, B f, B, etc., and C, D f, D, etc.,—indicating the keys of the scales; the other capital letters A B C D E F G arranged in vertical columns, denoting the pitch-names of the notes; the numerals 1, 2, 3, 4, 5, 6, 7, 8, in the right and left hand margins denoting the scale-degrees; *s* denoting sharp; *f* denoting flat; *n* denoting natural; *ss* denoting double sharp; *ff* denoting double flat; M denoting major key, and *m* denoting minor key. The proper notation of a given degree of a given scale will be found at the junction of the upright and horizontal columns or rows leading respectively from the marginal names of key and scale-degree. Thus in the key of D major, flat-3 is F-natural. Conversely, if it is desired to know the scale-degree of a given note in a given key, the scale-degree is found in the marginal column horizontally opposite that note in its proper key column. Thus, to find the scale-degree of the note E-sharp in the key of A major one finds by reference to the A column that E-sharp is horizontally opposite sharp-5, which is its scale-degree. Following the system above described, it will be seen that, given a scale-degree and key to find the tone or note, or given the tone or note and key to find the scale-degree, or given the scale-degree and tone or note to find the key, visual information of the matter sought will be furnished by the chart without need to resort to calculations. The foregoing is valuable for study or reference or to prepare a student to write with readiness various representations of the same thing and to develop familiarity with the details of notation above specified. This part of the chart, however, finds its peculiar utility when used in conjunction with and as a part of the right hand section, or main body of the chart.

The right hand section of the table or chart deals with musical intervals. Any two tones sounding simultaneously or in sequence are regarded in the practice of music as forming an interval with each other. This idea is so consistently carried out that two tones of identical pitch sounded simultaneously by two voices or instruments are regarded as bounding an interval. All intervals are named according to laws which are partly acoustical and partly conventional, as unisons or primes, seconds, thirds, fourths, etc., etc., and are described as perfect, major, minor, augmented, diminished, doubly- augmented, doubly-diminished. The characters used in the right hand section of the chart have the following meanings: The marginal characters in alinement with *M* denote scale-degrees in the major scale; the marginal characters in alinement with *m* indicate the corresponding scale-degrees in a minor scale. The numerals tabulated in the main body of the shart to wit; 1, 2, 3, 4, 5, 6, 7, 8, 9, 10, etc., denote intervals, or tone relationships, (unisons or primes, seconds, thirds, fourths, etc); M in the interval columns of the main body of the chart denotes major intervals; *m* denotes minor intervals; + (plus sign) denotes augmented; − (minus sign) denotes diminished; ⱡ (*a* with a cross) denotes doubly augmented; and ⱥ (*d* with a cross) denotes doubly diminished; --- denotes non-existent or impossible. Small letters *z, x, w, v,* \*\*\*\*\* and capital letters Z X W G etc., in alinement with the marginal words "cues", are cue-letters for cross reference, and while useful aids in the use of the chart are not essential to the invention. The columns or rows of characters denoting intervals or tone-relationships are so organized internally and so arranged with relation to the columns or rows of characters denoting scale-units, such as scale-degrees, and notes or tones, as visually to indicate the interval or tone relationship between any pair of such scale-units. And this is true whether such scale-units be expressed in terms of scale-degrees or of notes or otherwise; that is to say, any other established or arbitrary characters denoting scale-units may be used instead of the numerals denoting scale-degrees. The aforesaid visual information is preferably furnished by the arrangement shown in Fig. 1, of which the left hand section has already been sufficiently described.

Referring to the right hand section, at the right and left are vertical columns or rows of characters denoting scale-units, in this specific case being scale-degrees, the major scale-degrees being in the *M* column, and the minor scale-degrees being in the *m* column. These scale-degrees are in transverse or horizontal alinement with their appropriate note-characters in the left hand section of the chart. The body or main part of the right hand section comprises a number of vertical rows each containing a series of characters denoting intervals or tone-relationships, the unison character of each interval row, being opposite the scale-degree character between which and any other scale-degree such interval row is adapted to show the tone-relationship. By arranging the several unison characters opposite different scale-degree characters, thus providing an interval-row appropriate to each scale-degree, the intervals between any pair of scale-degrees may be found at a glance. To illustrate the use of the chart, suppose it is desired to find the interval from flat-6 up to flat-7 of the major scale: one moves from the figure f 6 in an upright marginal column headed *M*, transversely of the chart as far as the interval figure 1, or unison character, which is the starting point in each of the interval rows for reading its respective interval row; in that interval column horizontally opposite f 7, will be found the desired information, namely M2, a major second. Should one desire to find the interval from flat-6 down to flat-7, one begins as before and moves to the unison character 1 or starting point horizontally opposite, and then instead of looking up that column, looks down to the character opposite flat-7 and observes that m7, a minor seventh is the desired interval.

Should the problem be to find the interval between two tones in a given scale, as from G-flat up to C in the key of D*f* major, one finds D f in the major row of key notes at the top or bottom of the left hand section, and in said D f column finds note G*f*, moves horizontally to the right to the unison character 1, opposite G*f* in an interval row, and in that interval row observes that the figure + 4, is opposite C in said note column, indicating that an augmented fourth is the desired interval. The scale-degrees of the two notes may also be incidentally observed if desired in passing from the note column to the interval column; or the two notes may be first translated into scale degrees and the interval existing between the scale-degrees observed in the manner already described.

Observation between the several rows may be facilitated by the use of columns of cue-letters in arbitrary but identical series. The series is repeated in each of the two octaves tabulated in the right hand section of the chart. These serve as visual guides and enable one to refer readily across the chart without following the horizontal lines throughout. Thus, should one wish to verify interval and scale-degrees from B-natural down to D, in the key of B-flat major, one notes that the interval is from s 1 down to 3. The cue-letters opposite these are H and W. We now note the H-point in the diagonal row, and move downward to the W-point where M6 shows that the desired interval is a major sixth.

If the interval between the two given scale gradations is, in proper musical discourse, impossible, or non-existent that fact is indicated by the sign − −, and tone-relationships which are rare are so indicated on the chart by any arbitrary signs such as dots within the squares occupied by the interval characters. The rare tone-relationships are preferably shown in three grades, thus:

rare $\boxed{{}_\cdot+4}$; rarer $\boxed{{}^\cdot_\cdot+4}$; rarest $\boxed{{}^{\cdot\cdot}_{\cdot\cdot}+4}$.

The interval-rows are preferably parallel with each other, and parallel with the scale-unit-rows, as shown in Fig. 1 though this is not absolutely essential. They are also preferably arranged in the same order of sequence as the scale-unit-characters to which their several unison-characters are appropriate, so that the unison-characters will fall in a diagonal line or row adapted to be used as a reference index as above described, each unison-character being the starting point for its own interval row. Diagonal rulings demarking the unison-characters are also provided as further visual aids in reading the chart.

The scale units in the top and bottom borders or margins of the right hand section of the chart, are in series which are identical with or counterparts of, the vertical series of scale units, so that the several unison characters of the interval rows fall at the intersection of horizontal and vertical lines from identical scale unit characters.

Referring now to Fig. 2, a modification of the invention is shown illustrating essentially the same system of ascertaining intervals as already described. The interval rows instead of being parallel with the scale-unit rows, are diagonally arranged. To find the interval from sharp-5 in a major scale, up to flat-7, one moves from the unison character 1 opposite sharp-5, upwards in the diagonal row until he comes to the interval character horizontally opposite flat-7 which is −3, a diminished third, the interval sought.

Other arrangements of characters giving the same visual information in substantially the same manner are within the scope of this invention which is not limited to any specific form.

What I claim is:

1. A music chart or table comprising a column or row of characters denoting scale-units, and a column or row of characters denoting proper intervals and also comprising arbitrary signs to indicate improper or impossible intervals which enter rarely or never into the structure of melody, said rows being so organized and arranged with relation to each other, as visually to indicate the proper interval or the improper or impossible interval as the case may be, between a given one of said scale-units and any other one of said scale-units.

2. A music chart or table comprising a column or row of characters denoting scale-units, a number of correlated columns or rows of characters denoting intervals, the unison character or starting point of each interval row being opposite a different scale-unit character, and the characters of each interval row indicating the interval or tone-relationship between the scale-units opposite said interval characters respectively and the scale-unit opposite said unison character or starting point in such interval row, the interval rows being parallel with each other and arranged in the same order of sequence as the scale-unit characters to which their respective interval characters are appropriate.

3. A music chart or table comprising a column or row of characters denoting scale-units, and a number of correlated columns or rows of characters parallel therewith denoting intervals, the unison characters of the several interval columns being transversely opposite different and appropriate scale-unit characters, and the interval rows being arranged in the same order of sequence as the scale-unit characters to which their several unison characters are appropriate, whereby the unison characters will fall in a diagonal line or row adapted to be used as a reference index in the manner described.

4. A music chart or table comprising a column or row of characters denoting scale-units, and a number of correlated columns or rows of characters parallel therewith denoting intervals, the unison characters of the several interval columns being transversely opposite different and appropriate scale-unit characters, and the interval rows being arranged in the same order of sequence as the scale-unit characters to which their several unison characters are appropriate, whereby the unison characters will fall in a diagonal line or row adapted to be used as a reference index in the manner described, and diagonal rulings demarking said unison characters.

5. A rectangular music chart or table comprising vertical and horizontal borders or margins containing characters denoting scale-units consecutively arranged, the series of scale-units in the vertical and horizontal borders being counterparts of one another, and a number of parallel columns of characters denoting intervals severally placed in alinement with the characters of the horizontal marginal row, and having their interval characters transversely opposite the several characters in the vertical marginal row, the unison character of each interval row being transversely opposite the character of the vertical marginal row corresponding with the character of the horizontal marginal row in alinement with its respective interval row, and the other characters in each interval row denoting the interval or tone-relationship between the scale-unit horizontally opposite and the scale-unit horizontally or vertically opposite said unison character.

6. A music chart or table comprising a number of parallel rows or columns of characters denoting pitch-names of notes, each column containing the series of such characters for a different key, all of the said note characters in the several rows which have the same scale-degree being in transverse alinement, and a number of correlated columns or rows of characters denoting intervals so arranged with relation to the note characters as visually to indicate the interval between any two notes in any key.

7. A music chart or table comprising a column or row of characters denoting the scale-units of a major key, a correlated column or row of characters denoting the corresponding scale-units of a minor key, and a number of correlated columns or rows of characters denoting intervals, so arranged with relation to both rows of scale-unit characters as visually to indicate the interval between any pair of scale-units either in a major or minor key.

8. A music chart or table comprising a number of parallel rows or columns of characters denoting the pitch-names of the notes of scales, one such row for each key, and all of said characters in the several rows which have the same scale-degree being in transverse alinement; a series of characters, one in alinement with each of said rows denoting the major key of its row; a series of characters, one in alinement with each of said rows denoting the minor key of its row; two rows of characters parallel with the aforesaid rows, one denoting the major scale-degrees and the other the minor scale-degrees appropriate to the several rows of characters denoting pitch names or notes; and a number of correlated rows of characters denoting intervals so arranged with relation to the rows denoting notes and the rows denoting scale-degrees, as visually to indicate the interval or tone-relationship between any pair of scale-units, in any key, in any scale, either major or minor, whether said units be expressed in terms of the pitch-names of notes or in terms of scale-degrees, or otherwise.

9. A music chart or table comprising a number of parallel rows or columns of characters denoting the pitch-names of the notes of scales, one such row for each key, and all of said characters in the several rows which have the same scale-degree being in transverse alinement; a series of characters, one in alinement with each of said rows denoting the major key of its row; a series of characters, one in alinement with each of said rows denoting the minor key of its row; two rows of characters parallel with the aforesaid rows, one denoting the major scale-degrees and the other the minor scale-degrees appropriate to the several rows of characters denoting pitch names or notes; and a number of correlated rows of characters denoting proper intervals and comprising arbitrary signs to indicate improper or impossible intervals, said interval rows being so arranged with relation to the rows denoting notes and the rows denoting scale-degrees, as visually to indicate the proper interval or the improper or impossible interval as the case may be, between any pair of scale-units, in any key, in any scale, either major or minor, whether said units be expressed in terms of the pitch-names of notes or in terms of scale-degrees.

Signed by me at Somerville, Mass., this thirteenth day of September, 1904.

LEO RICH LEWIS.

Witnesses:
  IRA R. KENT,
  SUMNER ROBINSON.